United States Patent [19]

Westfall et al.

[11] 3,915,062

[45] Oct. 28, 1975

[54] SERVOMECHANISM OR RELAY USING FLUID PRESSURE

[75] Inventors: Norman Roy Westfall, Ogden; Michael Thomas Hammond, Penfield, both of N.Y.

[73] Assignee: Sybron Corporation, Rochester, N.Y.

[22] Filed: Dec. 3, 1973

[21] Appl. No.: 421,049

[52] U.S. Cl. .......................... 91/47; 91/386; 91/387
[51] Int. Cl.² .......................................... F15B 13/16
[58] Field of Search ......................... 91/47, 386, 387

[56] References Cited
UNITED STATES PATENTS

| | | | |
|---|---|---|---|
| 2,408,685 | 10/1946 | Rosenberger | 91/387 |
| 2,789,543 | 4/1957 | Popowsky | 91/47 |
| 3,080,853 | 3/1963 | Puster | 91/47 |
| 3,403,598 | 10/1968 | Franz et al. | 91/47 |
| 3,620,185 | 11/1971 | Keller et al. | 91/47 |

FOREIGN PATENTS OR APPLICATIONS

| | | | |
|---|---|---|---|
| 561,759 | 6/1944 | United Kingdom | 91/387 |

*Primary Examiner*—Paul E. Maslousky
*Attorney, Agent, or Firm*—Theodore B. Roessel; Joseph C. MacKenzie

[57] ABSTRACT

A servomechanism or relay of the pneumatic type using an expansible and contractible chamber made of flexible, more or less non-elastic material, an ejector-type nozzle, a force beam and a spring connected between one end of the beam and ground, the grounded end of the spring being fixed to the free end of a lever, with the other end of the lever being pivoted to a fixed axis passing through the point of attachment of said spring to said force beam. The recited elements are combined together in a variety of known combinations functioning as relays or servomechanisms.

7 Claims, 3 Drawing Figures

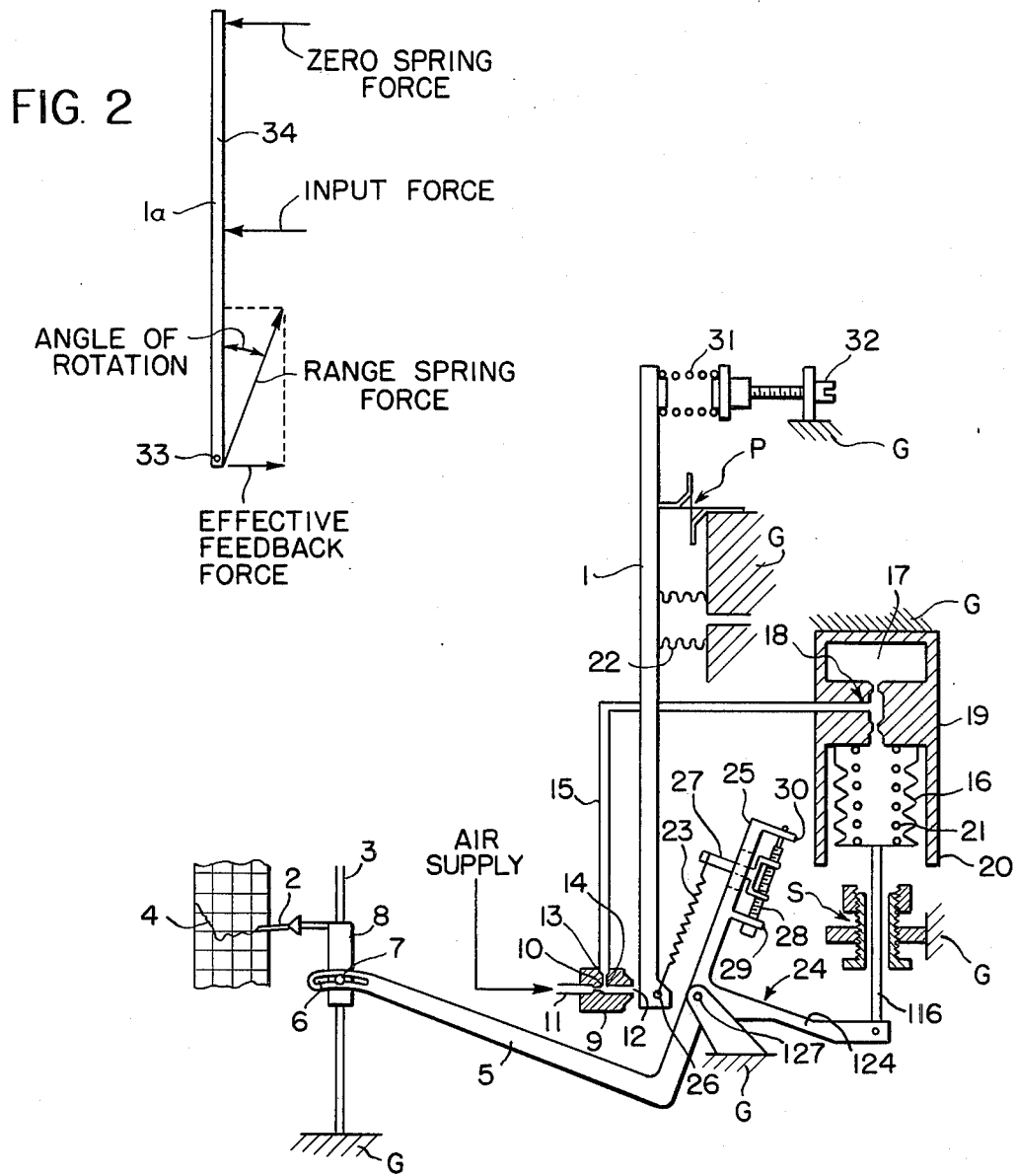

SERVOMECHANISM OR RELAY USING FLUID PRESSURE

BACKGROUND OF THE INVENTION

The field of the invention is instrumentation, in particular, relays and servomechanisms using fluid pressure and force balancing for producing an output force, fluid pressure, or motion representative of some input force, fluid pressure or motion.

Relays and servomechanism of the foregoing sort are well known to the art. An exemplary collection of the patent literature, emphasizing some of the structural features we utilize in the present invention, is as follows:

U.S. Pat. No. 3,574,486 to Bowditch et al.
U.S. Pat. No. 3,472,257 to Daruk et al.
U.S. Pat. No. 3,403,598 to Franz et al.
U.S. Pat. No. 3,285,071 to Plunk et al.
U.S. Pat. No. 3,239,139 to Chapin et al.
U.S. Pat. No. 2,978,908 to Stover
U.S. Pat. No. 2,761,317 to Seagrave, Jr.
German Pat. No. 879,466
German Pat. No. 698,189
German Pat. No. 693,336
German Pat. No. 681,544
British Pat. No. 567,300
Russian Pat. No. 198,013

One object of the present invention is to provide a new and improved form of servomechanism using fluid pressure wherein an ejector-type nozzle device is used for control of said pressure in a range including, in effect, positive and negative values.

A second object of the present invention is to provide a new and improved form of servomechanism or relay using fluid pressure wherein an expansible and contractible chamber device, or the like, is used for non-reactively providing position changes in response to fluid pressure.

A third object of the present invention is to provide a new and improved form of servomechanism or relay using fluid pressure wherein a non-reactively adjustable spring device is used for exerting a force on a force beam included in said servomechanism or relay.

A fourth object of the present invention is to provide a new and improved form of servomechanism using fluid pressure and combining the three devices referred to supra for providing a motion output in response to a force representative of a variable condition.

A fifth object of the present invention is to provide a new and improved form of relay using fluid pressure wherein said non-reactively adjustable spring device is used for producing a fluid pressure corresponding to adjustment of said spring device.

Other objects of the present invention in the way of new and improved forms of servomechanism or relays using fluid pressure will become apparent from the detailed description, infra.

SUMMARY OF THE INVENTION

In one form of the present invention a rubber bellows, or the equivalent, is connected to an ejector-type nozzle for expanding and contracting the bellows. Such expansion and contraction is used to adjust the position of a spring device connected to a force beam. The spring device has the property that such adjustment varies force exerted by the spring device on the beam, yet without the variation in said force reacting against the bellows. The said force is opposed by a second force applied to the beam, which controls the nozzle for expanding and contracting the bellows in such fashion that change in the second force leads to the first said force changing such as to balance the former said change.

In another form of the present invention, an input motion adjusts said spring device for varying the force on a beam. The beam controls a fluid pressure which is converted to a second force applied to said beam in opposition to the spring device force, the arrangement being that change in the spring device force results in a balancing change of said second force.

BRIEF DESCRIPTION OF THE DRAWING

FIG. 1 exemplifies a servomechanism according to the present invention.

FIG. 2 is a force diagram corresponding to FIG. 1.

DESCRIPTION OF THE PREFERRED EMBODIMENTS

Figure 3:
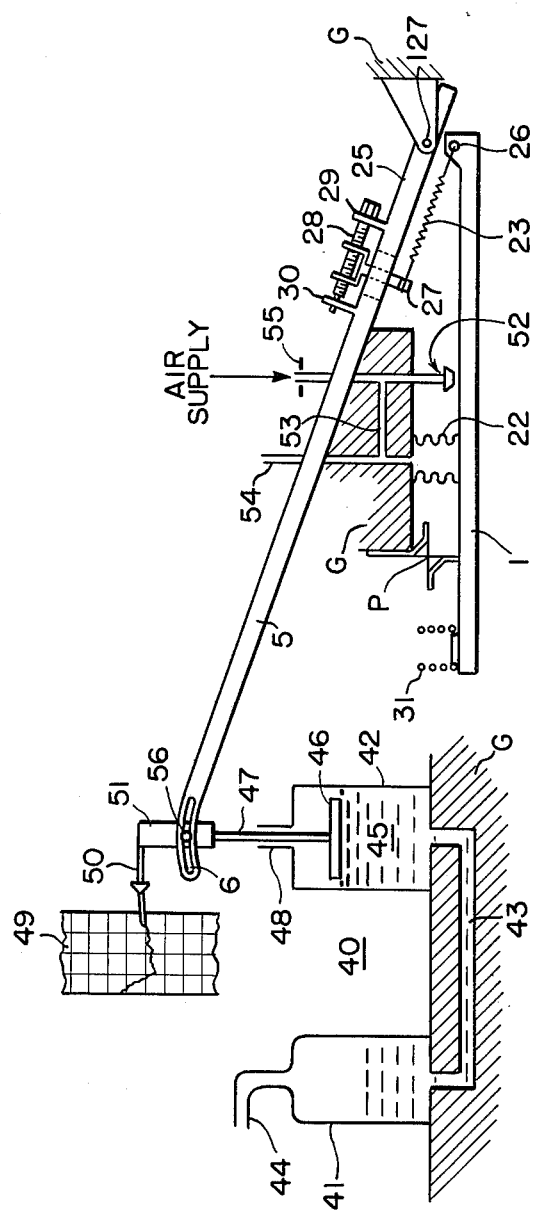
FIG. 3 exemplifies a relay according to the present invention.

In FIG. 1, we provide for exhibiting (i.e, recording, indicating, or the like) the magnitude of a force applied to a force beam 1, this force being generated by a bellows 22 fixed between mechanical ground G and the beam, and receiving a fluid pressure the magnitude of which corresponds to some variable condition such as temperature, pressure drop across an orifice in a fluid flow line, or the like.

The magnitude of the aforesaid condition is to be exhibited by running a stylus 2 up and down a guide rod 3 so that the stylus draws a trace 4 on a chart. The stylus is moved by a stylus arm 5 having a curved slot 6 in its end in which rides a stud 7 fixed to sleeve 8 carrying the stylus and through which the rod 3 passes. This is a conventional arrangement which need not be further described, other than to note that in instrumentation of the sort involved here, the stylus represents a somewhat demanding load, too much so to be directly handled by the pressure in bellows 22, let alone the condition represented by said pressure.

Beam 1 is pivoted to ground by a conventional crossed-strip pivot P, the axis of the pivot being perpendicular to the plane of the Figure.

Deflection of the beam 1 about said axis is detected by ejector-type nozzle 9. Nozzle 9 is essentially a piece of conduit having a restriction 10 between an inlet end 11 and an outlet end 12, and, just a little to the right of the restriction a tap 13. Tap 13 itself opens into the outlet portion of the nozzle via a restriction 14.

As indicated by legend, inlet end 11 is connected to a supply of air. The air supply is at a fixed pressure, typically 20 psig. filtered, dried and regulated, as is customary.

The opening at the outlet end 12 of the nozzle is located so that the surface of the end of beam 1 can act as a baffle. The dimensioning of the nozzle is such that if the end of the beam gets far enough away from outlet end 12, there will be a jet of air streaming therefrom and entraining air from tap 13 to such extent as to drop the pressure in tap 13 well below the zero psig or atmospheric pressure external to the nozzle, e.g., as low as about -10 psig but more typically -4 to -5 psig. Conversely, the beam surface should be able to get so close to the outlet end 12 as to drive the pressure in tap 13 up to substantially full supply pressure, in this example, 20 psig.

The tap 13 can have no pressure therein apart from some plenum, and in this case, such plenum is provided by pipe 15, chamber 17, and bellows 16, all tee-connected as indicated at 18. The connection 18 and chamber 17 are formed in a rigid housing member 19 having an open portion 20 forming a rough guide and protector for bellows 16 which is preferably made of rubber of sufficient flexibility to have poor shape stability and not much of a spring rate, outside of a rather light compression spring 21 just stiff enough longitudinally and radially that if a vacuum is drawn on the bellows 16, it collapses axially in customary bellows fashion, rather than in any other fashion. Likewise, if a positive pressure is applied inside the bellows 16, the guide 20 will prevent undue outward unfolding locally of the corrugations. In other words, the idea of using such a rubber bellows is to get the effect of a piston in a cylinder without the friction, leakage, etc. The bellows form is consequently so unstable the constraints radially of the bellows are needed to constrain the bellows to substantially strictly axial expansion and constraction. In other words, the bellows 16 is non-reactive, that is, it reacts appreciably neither to pressure expanding it nor contracting it. Preferably, a pair of adjustable stops, briefly and generally indicated at S. are provided to limit axial expansion and contraction of the bellows 10. Stops S and housing 19 are fixed to ground, of course. In contrast to the bellows 16, the input bellows 22 may be the usual metallic bellows.

According to the present invention, expansion and contraction of bellows 22 in response to changes in its internal fluid pressure are to be balanced by a spring 23, the effect of which is to be adjusted by bellows 16 in response to positive and negative pressures created by the end of beam 1 moving toward and away from nozzle 9. This is accomplished by rotating the spring 23 about an axis passing through the point on beam 1 to which it is connected, but without changing the stress in the spring. For this purpose, lever 24 includes an arm 124 and bellows 16 has fixed to its free end a rod 116, rod and arm being connected together for translating the displacements of rod 116 into deflections of lever 24. Since the connection between rod 116 and arm 124 has to move in an arc, in effect, at least some lateral play may be provided for the rod 116 in order to allow the bellows to deflect lever 24 freely.

The stress in spring 23 is maintained adjustably fixed by lever 24 pivoted at one point to the aforesaid axis passing through the point on beam 1 to whch the spring 23 is connected, the spring being connected to an arm 25 of said lever by means of an adjusting device for varying the length of the spring in order to set the stress in the spring at some predetermined value. In particular, a stud 26, coaxial with the last said axis (which is perpendicular to the plane of the Figure), fixes one end of the spring rotatably on said axis and to said beam, and an adjustable abutment 27 has the other end of said spring fixed thereto. Abutment 27 is threaded onto a screw 28 which is mounted on the arm 25 of lever 24 in a pair of posts 29 and 30 which allow the screw to be turned but otherwise keep it fixed in place. Supposing the screw 28 to be turned, then the abutment 27 moves to shorten or lengthen the spring. In the present case, the spring is under tension, but obviously it could be a compression spring, and in either case, changing its length allows for adjusting the stress therein.

Lever 24 is pivoted to ground by a pivot 127. While for clarity pivot 127 is shown offset from the lower end of beam 1, actually the pivot 27 would be over (or under) the lever end of beam 1, since the axis through stud 26 is also the axis about which lever 24 pivots.

In any event, it will be evident that as long as the pivot axis of pivot 127 passes through the effective point of application of the force of spring 23 to beam 1, and the attachment allows the spring to pivot about that point, then the arm 24 can be rotated without work being done. While it is true that there is friction and inertia to be overcome in rotating arm 24 (and there is also the friction and inertial load represented by the stylus assembly, and arm 5, etc.), nevertheless the resistance is not a reaction due to adjusting the force of spring 23, since the spring's tension does not change materially (it does change very slightly because, for well-known reasons, the beam 1 must deflect slightly during operation, etc.) The same would be true, of course, were the spring being used in compression rather than in tension.

However as can be seen from the vector diagram, FIG. 2, the moment on beam 1 does change, because it is proportional to the sine of the angle which the effective length of arm 25 makes with the effective lever arm 1a of beam 1.

Adjusting the abutment 27 along arm 25 provides for span, that is to say range, adjustment. A zero spring 31, adjustably compressed between mechanical ground and the upper end of beam by means of adjusting screw 32, provides for zero adjustment. By inspection, it will be apparent, and particularly from FIG. 2, that if various forces acting on the lever are such that (1), the point 33 in FIG. 2 is the locus both of the effective attachment of spring 23 to the effective length of beam 1 and the axis of pivot 127 (2), the point 34 is the axis of pivot P, (3) 1a denotes the effective length of beam 1, and (4) the various forces, deflections and effective lengths are perpendicular to both said axes and in the plane of the paper, then the sum of the movement of all the forces on the beam must be zero for the FIG. 2 configuration to exist. In this configuration it will be observed that the vertical component of the force of spring 23 will be absorbed by the reaction of the pivot P, so that the balance of moments is dependent solely on spring 31, the horizontal component of the force of spring 23, and the force due to bellows 22. Furthermore, in this configuration the zero and range adjustments do not interact.

The use of nozzle 9, of course, is to detect departure of beam 1 from the aforesaid configuration, and in response, to apply positive or negative pressure, as needed, to bellows 16 such as to return the beam to the aforesaid configuration, namely, with the point of attachment of spring 23 to beam 1 coinciding with the axis of pivot 127. If the lower end of the beam moves far enough away from outlet 12, the flow out of the nozzle attains a rate high enough that a relative vacuum is created in tap 18, so that air is drawn out of bellows 16, via line 15, such air being entrained by the jet of air issuing from restriction 10, and ejected through the outlet 12. The bellows 16 will try to collapse axially because the pressure inside it is negative with respect to the pressure on it exterior. In so doing, the bellows 16 will rotate arm 25 counterclockwise, and the horizontal component of the force of spring 23 will decrease. Because the sense of this component is such as to pull the beam 1 away from the nozzle, whatever it was that caused the lever to move away from the nozzle in the first place, now receives less aid from spring 23. In the present case, it is contemplated that the original lever deflection was caused by change in the force exerted by bellows 22 or by spring 31, and that such change would change the moment of beam 1 by not more than an amount such that the subsequent deflection of arm 25 will go far enough to induce such change in the horizontal component of the force of spring 23 as will produce a equal and opposite change in the moment of beam 1.

Bellows 16 will continue to deflect arm 25 until the net force due to pressure, which force will be proportional to the difference between the absolute pressures acting inside and outside the bellows, becomes less than that which would be due to the least detectible deflection of beam 1. What the least detectible deflection is depends mainly on the frictional resistance to deflecting the lever 24, namely, that of pin 7 in slot 6, that of carriage 8 on rod 3, and that of rotataion of the end of spring 23 at point 26. Pivot 27 would also contribute friction unless it were of the cross-strip type, which is frictionless.

In terms of absolute pressure, the pressure in bellows 16 can vary from 10 to 30 psia, as opposed to the approximately 15 psia exerted on its exterior by the ambient atmosphere. This range of pressure is produced by a range of movement of the beam 1 ranging from substantially zero spacing from outlet 12 to a few thousands of an inch spacing therefrom. It is very easy to reduce the frictional resistance referred to, supra, to a level less than that which can be handled easily be a few tenths psi change in the pressure difference across bellows 16.

The spring 21 increases the rather slight spring rate of bellows 16. However, the effective spring rate of the bellows is still small as compared to forces exerted by bellows 22, or by the spring 23, on beam 1. Consequently, vary little energy is absorbed in expanding bellows 16, or released by contracting it. In fact, the effective spring constant of bellows 16 may be made smaller than the frictional resistance of the load it moves. Consequently, when the moment of the beam 1 is in balance (i.e., adds up to zero), the air supply to nozzle 9 may be interrupted, without bellows 16 detecting it because at this point the pressure therein will be approximately atmospheric, and to the extent that is not, there will be frictional resistance to deflecting lever 24. Accordingly, the stylus 2 will remain in the position it had when the pressure was turned off. In other words, the servomechanism has a memory of where it was, so to speak, when its supply pressure was cut off.

The resistance of lever 24 to deflection can be small enough to utilize the basic mechanism of FIG. 1 as a relay having a fluid pressure output, instead of as a servomechanism having a motion or position change output. For example, in FIG. 3, a mercury manometer 40, comprising the usual legs 41 and 42 connected at the bottom by a conduct 43 and having an inlet fitting 44 connected to the fluid pressure being measured, a filling of mercury 45, and a float 46 partly immersed in the mercury in leg 42 and having a guide rod 47 running through a guide 48 terminating leg 42, records fluctuations in the mercury level on a chart 49 by means of a stylus 50 supported by a carriage 51 fixed to the end of rod 47. It may be supposed that the ambient atmosphere has free access to the space above the mercury in leg 42, hence the manometer is recording the gauge pressure value of the pressure admitted by fitting 44 to the space in leg 41 over the mercury therein.

The preceding described manometric device is quite conventional. It is sometimes desired to transmit its measurement remotely of the manometer and/or to transform the changes in vertical position of float 46 into a corresponding fluid pressure. According to the present invention, such purposes can be served by coupling the float to a modification of the servomechanism according to the invention. As will be seen from FIG. 3, the modification consists essentially of eliminating bellows 16, nozzle 9, and associated structure, and replacing the nozzle 9 with a nozzle 52 connected by conduit 53 to the bellows 22. Bellows 22 has a conduit 54 for connecting to a suitable receiver such as a pressure gauge, controller, etc. or indeed to a bellows 22 of the servomechanism form of my invention. To the nozzle is also connected the usual air supply, via an orifice 55, which air supply may be the same as that used in the FIG. 1 form of my invention. Nozzle 52 differs from nozzle 9 in that the former is the more usual type, the back pressure of which cannot become less than that of the atmosphere into which it discharges.

The operation of the FIG. 3 form of our invention is more or less self-evident. In any event, float 46 moving up and down not only provides the power for moving stylus 50, it also pivots the arms 5 and 25 by means of a stud 56 fixed to carriage 51 and riding in the slot 6 of arm 5. In effect, float 46 is doing what bellows 16 did in FIG. 1. Thus, if float 46 moves up, spring 23 rotates clockwise, thereby deflecting beam 1 counterclockwise. This brings the surface of the beam 1 closer to nozzle 52 thereby throttling it so as to cause a pressure increase in bellows 22. Bellows 22 accordingly deflects beam 1 clockwise substantially back to its original position, as will be evident from well-known principles of force balance instruments of various sorts. The pressure in bellows 22 is propagated via conduct 54 to whatever is connected thereto (another bellows or equivalent whereby the vertical position of float 46 is translated into a fluid pressure of corresponding magnitude.

In the claims appended hereto, we have adopted the term "non-reactively" as a limitation of the scope of the claims. It does not require citation of the prior art to say that conceptually the idea of an expansible and contractible chamber device with "zero spring rate," i.e., no resistance to expression and contraction is well understood, and in practice reasonably-well approximated by rubber bellows, pistons, slack diaphragms, and what not. Further, the particular mechanical arrangement of spring 23 is, as will be seen from the art cited at the beginning of the present specification, a well-known, not-infrequently-used expedient, and it, too, is used by us for its approximate non-reactive property. Accordingly, the term "non-reactively" is quite appropriately used in the claims for defining the corresponding structure, not merely because such structures are not per se novel but, very importantly, for the sake of clarity and minimization of verbiage.

The foregoing is a description of my invention in full accordance with the statutes. While we have cast our description in terms of certain structural elements, the essence of our invention resides in the cooperation of these elements together. Accordingly, various uses and structural modifications, which will be obvious to one skilled in the art, may be undertaken without departing from the scope of the invention. For example, in the case of the invention as shown in FIG. 1, lever 5 could be positioned directly by hand, or by hand-operated adjusting mechanisms (not shown) for producing an output pressure proportional to the position of lever 5, or to the amount of adjustment of such mechanism.

We claim:

1. A servomechanism comprising, in combination, first means having spring means with stress for generating variable first force from said stress and having an element for varying said first force non-reactively and in correspondence with position change applied to said element, but without varying said stress;

second means for generating variable second force representative of a variable condition;

third means having chamber means for non-reactively generating position change corresponding in sense to sense of fluid pressure applied to said chamber means said chamber means responding to said fluid pressure being applied therein by expanding substantially without resistance, provided said fluid pressure is greater than ambient pressure; said chamber means responding to said fluid pressure being applied therein by contracting substantially without resistance, provided said fluid pressure is less than ambient pressure;

fourth means for generating fluid pressure corresponding in sense to sense of change in said variable condition;

said chamber means being connected to said element for applying said position change thereto, said fourth means being connected to said chamber means for applying said fluid pressure thereto, and said first and second means being interconnected for causing said first and second forces to oppose one another;

said second means being connected to said fourth means for causing the latter to generate said fluid pressure with such sense as to cause said first variable force to change in a sense and magnitude such as to balance said second variable force.

2. The servomechanism of claim 1, wherein, said spring means is a stressed spring connected at one end to a point of said second means and arranged to be bodily rotatable by said element about said point for varying sid first force as a function of rotary position of and the stress in said spring, but without changing said stress;

said first means including span means for adjusting the said stress in said spring;

and there being zero means for generating adjustable fixed force, said zero means being operatively connected to said first and second means for modifying the balance of the forces exerted thereby in accordance with said fixed force.

3. The servomechanism of claim 2, wherein, said first means comprises a lever one end of which has a point to which the other end of said spring is connected, and the said lever being pivoted on a given axis having thereon said point of said second means, and said spring is connected between said points for exerting force due to its said stress along a straight line containing said points;

said lever providing said element, and said span means being an adjustable means interconnecting said spring and said element for varying said stress.

4. The servomechanism of claim 1, wherein, said chamber means is non-reactively expansible and contractible chamber means connected to said fourth means for having said fluid pressure applied thereto for expanding and contracting said chamber means, and said chamber means being connected to said element for applying position change thereto corresponding to said fluid pressure.

5. The servomechanism of claim 1, wherein, said forth means includes flow nozzle means having a tap from which fluid will flow due to entrainment by fluid flow through said nozzle means if rate of said flow is greater than a given rate;

said fourth means also having baffle means operable for allowing said flow to exceed said given rate or for obstructing said flow sufficiently to cause fluid in said flow to flow into said tap;

said third means being connected to said tap for having said flow from or into said tap applied to said chamber means as said fluid pressure; said baffle means being effectively connected to said second means for operation thereby such as to cause the last said flow to correspond to change in said condition.

6. The servomechanism of claim 1, wherein, said third means includes non-reactively expansible and contractible chamber means connected to said forth means for having said fluid pressure applied thereto for expanding and contracting said chamber means, and said chamber means being connected to said element for applying position change thereto corresponding to said fluid pressure;

said fourth means includes flow nozzle means having a tap from which fluid will flow due to entrainment by fluid flow through said nozzle means if rate of said flow is greater than a given rate;

said fourth means also having baffle means operable for allowing said flow to exceed said given rate or for obstructing said flow sufficiently to cause fluid in said flow to flow into said tap;

said chamber means being connected to said tap for having said flow from or into said tap applied thereto as said fluid pressure for expanding or contracting said chamber means, and said baffle means being effectively connected to said second means for operation thereby such as to cause the last said flow to correspond to change in said condition.

7. A relay comprising, a lever for being pivoted about a first given axis;

said lever having a spring, said spring having one end connected to a point on said lever spaced from said given axis;

a force beam pivoted for deflection about a second given axis parallel to said first given axis and there being force balance means operatively connected to said beam for sensing deflection thereof out of a given position and, in response to said deflection, for causing said beam to deflect in the opposite sense;

said spring having its other end connected to a point on said beam spaced from said second given axis; said given position being one wherein the last said point is on said first given axis, and the connection of said spring to said beam being rotatable about said first given axis when said beam is in said given position; and said spring being arranged to exert force directed along its length and between the said points;

said relay including means for adjusting the length of said spring, said spring's said force being a function of the length thereof and there being adjustable zero spring means acting on said beam.

* * * * *

PO-1050
(5/69)

UNITED STATES PATENT OFFICE
CERTIFICATE OF CORRECTION

Patent No. 3,915,062  Dated  October 28, 1975

Inventor(s) Norman Roy Westfall & Michael Thomas Hammond

It is certified that error appears in the above-identified patent and that said Letters Patent are hereby corrected as shown below:

Claim 1, line 2 "therein" should be inserted after --stress--;

Claim 2, line 5 "sid" should be --said--;

Claim 6, line 2, "third" should be --chamber--.

Signed and Sealed this second Day of March 1976

[SEAL]

Attest:

RUTH C. MASON
*Attesting Officer*

C. MARSHALL DANN
*Commissioner of Patents and Trademarks*